Patented Mar. 4, 1952

2,587,662

UNITED STATES PATENT OFFICE 2,587,662

3-ISOPROPOXY PHENOTHIAZINE

Nathan L. Smith, Indian Head, Md.

No Drawing. Application October 30, 1950,
Serial No. 193,019

1 Claim. (Cl. 260—243)

(Granted under the act of March 3, 1883, as
amended April 30, 1928; 370 O. G. 757)

This invention relates to a new phenothiazine derivative.

The new compound of the invention is 3-isopropoxy phenothiazine of the structural formula:

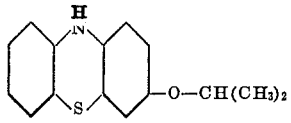

which is an antioxidant for substances such as gasoline and petroleum lubricating oils and for synthetic lubricants such as diesters and polyethylene glycol.

The new compound may be prepared in known way by reacting sulfur with the corresponding diphenylamine in the presence of iodine as catalyst. The preparation thereof is illustrated by the following specific example in which parts are by weight.

Example 1 part sublimed sulfur was mixed with 4 parts p-isopropoxy diphenylamine and 0.5 part iodine. The mixture was heated at 130–140° C. for one-half hour. The product was taken up in petroleum ether from which it crystallized in the form of yellow leaflets, M. P. 123–124° C.

The invention described herein may be manufactured and used by or for the Government of the United States of America for governmental purposes without the payment of any royalties thereon or therefor.

What is claimed is:

As a new compound, 3-isopropoxy phenothiazine.

NATHAN L. SMITH.

REFERENCES CITED

The following references are of record in the file of this patent:

UNITED STATES PATENTS

| Number | Name | Date |
|---|---|---|
| 2,024,477 | Scott | Dec. 17, 1935 |
| 2,504,980 | Houston et al. | Apr. 25, 1950 |
| 2,505,772 | Houston | May 2, 1950 |

OTHER REFERENCES

Pummerer et al.: Chem. Abst., vol. 7, (1 page, 3337–3339).